United States Patent [19]

De Marco et al.

[11] 3,828,141

[45] Aug. 6, 1974

[54] SYSTEM FOR DETECTING DIAL-GENERATED AND PUSHBUTTON-GENERATED SELECTION PULSES

[75] Inventors: Franco De Marco; Carlo A. Manghi, both of Milan, Italy

[73] Assignee: Societa Italiana Telecomunicazioni SIEMENS S. p. A., Milan, Italy

[22] Filed: June 20, 1972

[21] Appl. No.: 264,494

[30] Foreign Application Priority Data

June 22, 1971 Italy .................................. 7241/71

[52] U.S. Cl. ......................... 179/84 VF, 179/16 EC

[51] Int. Cl. ........................................... H04m 1/50

[58] Field of Search ....... 179/16 EC, 18 ET, 84 VF, 179/84 SS

[56] References Cited

UNITED STATES PATENTS

| | | | |
|---|---|---|---|
| 3,008,009 | 11/1961 | Van Lottum et al. ......... | 179/16 AA |
| 3,140,358 | 7/1964 | Martens ...................... | 179/84 VF X |
| 3,476,881 | 11/1969 | Hensbergen et al. ........ | 179/84 SS X |
| 3,538,262 | 11/1970 | Gasser et al. ................... | 179/18 EB |
| 3,636,269 | 1/1972 | Edstrom ........................ | 179/84 VF |

*Primary Examiner*—Thomas W. Brown
*Attorney, Agent, or Firm*—Karl F. Ross; Herbert Dubno

[57] ABSTRACT

In order to discriminate between true and spurious key signals in a telephone system in which a d-c subscriber line is independently closable by separate hook switches in series with a dial-type and a pushbutton-type digit selector, an exchange serving this line includes a low-level current sensor and an intermediate-level current sensor working into a coincidence circuit. In the presence of an output from the intermediate-level sensor with simultaneous absence of an output from the low-level sensor, the coincidence circuit connects the line wires across a voice-frequency tone receiver unless a transient condition is simultaneously indicated by the output of a differentiator connected across a pair of resistors in a branch circuit containing the two level sensors. A relay actuated by the output of the coincidence circuit disables the differentiator upon the detection of a key signal.

7 Claims, 3 Drawing Figures

SYSTEM FOR DETECTING DIAL-GENERATED AND PUSHBUTTON-GENERATED SELECTION PULSES

Figure 1:
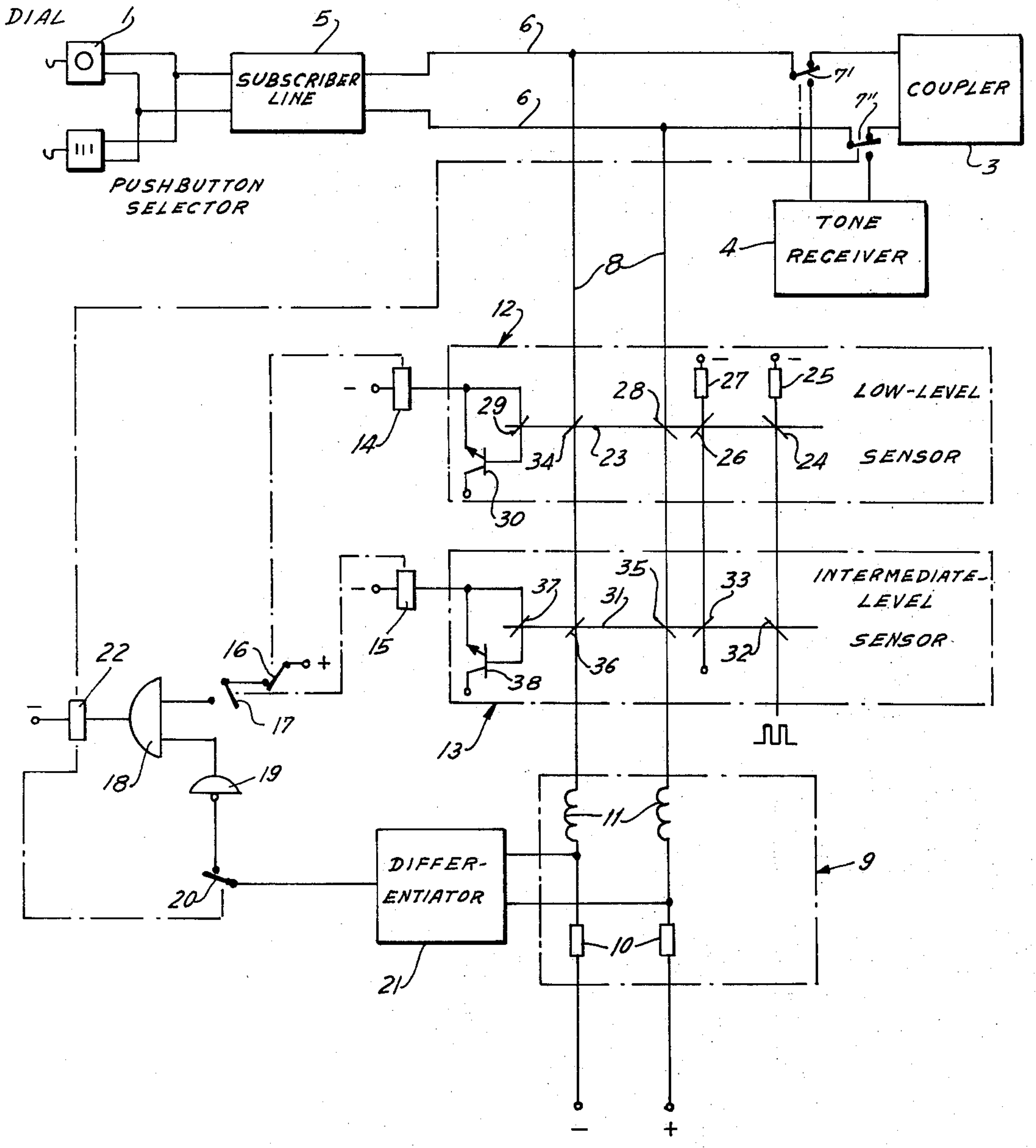

Our present invention relates to a system for the detection of direct-current key signals originating from telephone apparatus with selection by pushbuttons using voice frequencies. With this type of selection, every digit is transmitted by pushing a button with the consequent emission of one or more predetermined frequencies. The digit is detected in the exchange with the aid of a suitable receiver.

There are known signaling systems in which the selected frequencies are accompanied by a so-called "key signal," that has the purpose of inserting a receiver in the subscriber's line carrying a selected digit. In the case here considered, the key signal is constituted by a lowering of the level of the direct current that circulates in the subscriber's line for the whole time that the selection button is pressed. The choice of the activation level for the key signal is conditioned by the need for compatibility between the pushbutton selection system and the disk dialing system, so that the two selection systems can exist side by side.

In telephone installations using telephones equipped with dialing disks, the information relating to the number selected is transmitted from the receiver to the exchange by means of a signal taking the form of line-current interruptions, which are usually momentary variations in the line current from a first level called "hook closed" (handset lifted) to a second level called "hook open" (handset put down, i.e. hung on the hook); these are produced by the action of the disk when each digit of the number is selected.

The key signals of the pushbutton systems are, on the other hand, sometimes constituted by momentary drops in the line current from the above-mentioned first level of hook closed to an intermediate third level between the other two.

This particular way of transmitting information about the selected digits creates problems in the case of the introduction of a pushbutton selection service where not all the subscribers of the same exchange are equipped simultaneously with this service; in this case, the switching (of necessity not instantaneous) from the hook-closed level to the hook-open level, due to the line-current interruptions caused by disk dialing, causes the current to pass through the intermediate level of the pushbutton system; this can cause false key-signal detection.

The object of this invention is to provide a system that efficiently distinguishes and separates the key signals of pushbutton apparatus from current interruptions caused by disk dialing in such a way as to obviate spurious activation of the voice-frequency receiver during disk dialing.

Thus, the system according to the present invention serves for the detection of key signals in the form of momentary current variations in the line, from a first level of "hook closed" to a third, intermediate level between the aforementioned first level and a second level of "hook open." The system comprises a first detector that is sensitive to the reduction of the line current below the maximum admissible value of the aforesaid second level, a second detector sensitive to the reduction of the line current below the maximum admissible value of the third level, a third detector responsive to the simultaneous presence of the output signal from the second detector and the absence of an output signal from the first detector, and a fourth detector, sensitive to variations in the line currents, which blocks the third detector during the phase of current variation from the first level to the second or third level and vice versa. We further provide switch means responsive to the output signals of the third detector for directing the frequency-coded selection signals to a receiver suitable for pushbutton operation.

Our improved signal-discriminating system always provides a clear indication of the state of the line that connects the dialing apparatus to the associated receiver and, in particular, makes it possible to distinguish and separate pushbutton-generated line-current reductions from those of the dialing disks, thus avoiding the possibility of signaling errors. In this way only the combination of the presence of an output signal from the second detector or intermediate-level sensor with the absence of an output signal from the first detector or low-level sensor and of a blocking signal from the fourth detector or transition sensor (indicating the presence of a true key signal produced by the operation of a pushbutton selector) causes the third detector or coincidence circuit to divert the frequency-coded signals to the receiver associated with pushbutton apparatus; any other combination of presence and absence of signals at the input of the third detector stops this detector from emitting an output signal and thus maintains the switching device in its normal state. This is particularly true of the presence of an output signal from the second detector and the absence of an output signal from the first detector (indicating key signal levels) during a transition phase of current variations caused by an interruption signal from a disk-type dialing apparatus. Thus any possibility of generation of spurious key signals is excluded.

Figure 2:
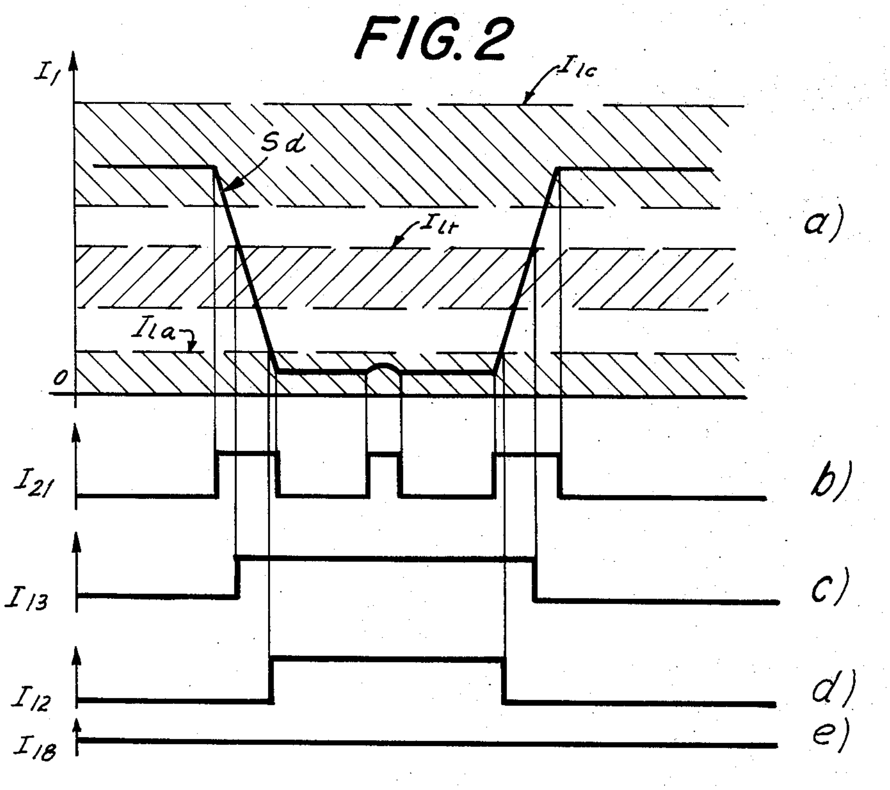
Figure 3:
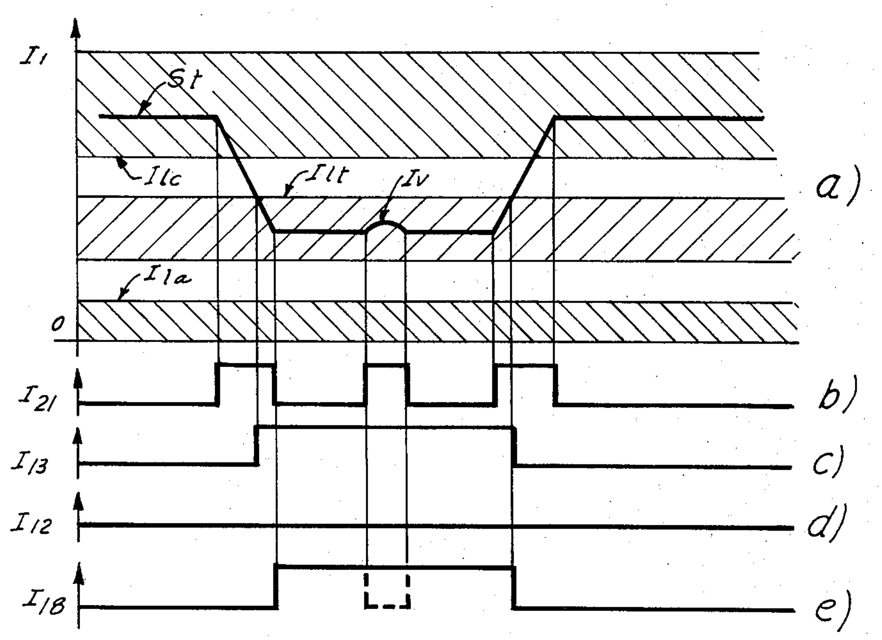

These and other features of our invention, together with the advantages derived therefrom, will be best understood from the following detailed description given with reference to the accompanying drawing in which:

FIG. 1 shows a circuit diagram of a signal-discriminating system according to our invention, inserted into a telephone installation which includes both disk-type and pushbutton-type digit-selection equipment intended for the same subscriber;

FIG. 2 is a set of graphs showing the line-current flow at the moment of the transmission of an interruption signal produced by a dialing disk and the outputs of the several detectors included in the system of FIG. 1; and FIG. 3 is a set of graphs showing the flow of the line current at the moment of the transmission of a key signal emitted by a pushbutton apparatus and the resulting variations in the outputs of the detectors.

The telephone system of FIG. 1 includes a disk-type dialing apparatus 1 and a pushbutton-type digit selector 2 (here assumed to be part of the same subscriber station) which are connected to a coupler 3 intervening in the conversation phase and to a receiver 4 for the frequency-coded signals produced by pushbutton selector 2. The connection includes a subscriber line 5 and a pair of wires 6 provided with a pair of contacts 7', 7'' (in FIG. 1, they are shown in their normal position); these contacts are reversible to switch the wires 6 from coupler 3 to receiver 4 and vice versa. The two wires 6 receive current via a wire pair 8 energized by a power supply 9 including a bridge circuit composed of two resistors 10 and two inductors 11. Wires 8 have associated with them a first and a second threshold detector 12 and 13; the outputs of these detectors energize two relays 14 and 15 whose respective contacts 16 and 17 are connected in series to one of the inputs of an AND gate 18 representing a third detector (in FIG. 1 the two contacts are shown in their normal position). To another input of AND gate 18 is connected the output of a fourth detector 21, via an inverter 19 and a contact 20 (shown in normal position). Detector 21 is a differentiation circuit bridging the junctions of resistors 10 and inductors 11. Finally, there is a relay 22, controlling contacts 7' and 7'', connected to the output of AND gate 18.

Detector 12 has a magnetic core 23 with a rectangular hysteresis loop, represented by the so-called Karnaugh flux symbols, which carries a first winding 24 energized by a square-wave current via a resistor 25, a second winding 26 energized by a constant biasing current via a resistor 27, a third winding 28 and a fourth winding 34 in series with respective wires 8 and, finally, a pulse-generating fifth winding 29 which lies in the base/emitter circuit of an NPN transistor 30 having the relay 14 connected to its emitter.

In its turn, detector 13 comprises a magnetic core 31 having a rectangular hysteris loop, also represented by Karnaugh fluid symbols, carrying a first winding 32, in series with winding 24 and traversed by the same square-wave current, a second winding 33 in series with winding 26 and supplied with the same constant biasing current via resistor 27, a third winding 35 and a fourth winding 36 inserted in series with windings 28 and 36, respectively, in wires 8 and, finally, a pulse-generating fifth winding which lies in the base/emitter circuit of an NPN transistor 38 having the relay 15 connected to its emitter.

To understand the working of the system shown in FIG. 1, it must be assumed that the disk selector 1 is of a type that holds the line current $I_1$ at a first level within an upper range $I_{1c}$ when the handset is lifted ("hook closed" condition) and causes the line current to switch to a second level within a lower range $I_{1a}$ when the handset is put down ("hook open" condition), or upon operation of the dialing disk to select a digit with generation of current interruptions $S_d$, all as shown in FIG. 2(a).

Analogously, the pushbutton selector 2 is of a type that maintains the line current $I_1$ at a first level within the upper range $I_{1c}$ when the handset is lifted ("hook closed" condition) whereas the line current is attenuated to a third level within an intermediate range $I_{1t}$ upon every depression of one of the buttons to form a digit of a number, with generation of key signals $S_t$ as shown in FIG. 3(a).

In its turn, the detector 12 is of a type that produces a non-zero output current $I_{12}$ (and hence can excite relay 14) only when the line current $I_1$ is at a level lower than the upper limit of the lower range $I_{1a}$. Only under those conditions will the winding 29 have an output voltage sufficient to render the transistor 30 conductive. The current $I_{12}$ due to the generation of signals $S_d$ and $S_t$ has been illustrated in FIGS. 2(d) and 3(d), respectively. The detector 13, on the other hand, is of a type known per se generating a finite output $I_{13}$ sufficient to energize the relay 15 only when the line current $I_1$ is below the upper limit of the intermediate range $I_{1t}$. Only these conditions carry the output voltage of winding 37 to such a value as to make transistor 38 conduct. The form of current $I_{13}$, when signals $S_d$ and $S_t$ are generated, is shown in FIGS. 2(c) and 3(c), respectively.

Finally, the differentiation circuit 21 is of a type that produces a non-zero output current $I_{21}$ (blocking the AND gate 18) in response to variations of the line current, for example during switching from the upper range $I_{1c}$ to the lower range $I_{1a}$ or to the intermediate range $I_{1t}$ and vice versa. The form of current $I_{21}$, when signals $S_d$ and $S_t$ are generated, is shown in FIGS. 2(b) and 3(b), respectively.

From a consideration of these premises, the working of the system of FIG. 1 will be evident. Thus, contacts 7' and 7'' stay in the normal position, conveying key signals to coupler 3, for as long as relay 22 is deenergized, that is, for as long as the AND gate 18 is blocked. This occurs when both detectors 12 and 13 are in the quiescent state, that is, when the line current lies in the upper range $I_{1c}$ (handset raised without operating either the dialing disk of apparatus 1 or the pushbuttons of apparatus 2), or else when both detectors 12 and 13 are activated by the line current in the lower range $I_{1a}$ (handset hung up, or generation of an interruption signal $S_d$ due to the operation of the dialing disk of apparatus 1). The same is true when only the detector 13 is activated (presence of key signals due to the depression of a button in apparatus 2, or else a transition phase of an interruption signal $S_d$) but when, at the same time, differentiator 21 detects a variation in the level of the line current, that is, a transition phase. The AND gate 18 conducts and excites relay 22 (with the consequent reversal of contacts 7 to connect the receiver 4) only upon the coincidence of the deactivation of detector 12 (line current above the upper limit of the lower range $I_{1a}$), of the activation of the detector 13 (line current below the upper limit of the intermediate range $I_{1t}$) and the deactivation of the differentiator 21 (line current not in a transition phase), that is, only in the case of the presence of a key signal $S_t$. The form of the output current $I_{18}$ of gate 18 in the two aforementioned situations is therefore that shown in FIGS. 2(e) and 3(e), respectively.

The system of FIG. 1 is therefore able to discriminate efficiently between the key signals $S_t$ and the interruption signals $S_d$, eliminating any trouble linked to the generation of spurious key signals during the transition phase of the interruption signals. The differentiator 21 has the task of maintaining gate 18 in the blocked condition during the above-mentioned transition phases, so that any false triggering of the two threshold detectors 12 and 13 is rendered harmless.

It should be noted that contact 20 controlled by relay 22 causes the differentiator 21 to be disabled immediately after every detection of a key signal $S_t$: this is to prevent small current variations ($I_v$), occurring during the generation of a key signal, from permaturely canceling the same key signal (see graphs *a*, *b* and *e* of FIG. 3).

It should also be noted that the activation signal for the differentiator 21 is a voltage developed across the resistors 10; this voltage is exactly proportional to the line current and thus is much 'cleaner' than one developed across the inductors 11.

It should be finally noted that the system shown in FIG. 1, although specifically directed to the solution of the problem of distinguishing the key signals from the interruption signals in mixed telephone installations having disk dialing apparatus and pushbutton apparatus, may also be used in installations with only pushbutton apparatus; this, for example, can distinguish key signals from interruption signals generated at the moment of replacing the handset. For this reason, once the disk selectors are completely replaced by pushbutton selectors, the system can be left in service without disturbing the working of the installation and without requiring any modifications thereof.

Elements 18 – 21 may be omitted if relays 14 and 15 are made slow-releasing and slow-operating, respectively, so that in the situation of FIG. 2 the contact 16 is opened at least as long as the contact 17 is closed.

We claim:

1. A system for discriminating between true and spurious key signals in a telephone line provided with hook-switch means establishing a relatively high line-current level in a closed condition and a relatively low line-current level in an open condition thereof, said line extending between a subscriber station provided with digit-selection means including pushbutton equipment and an exchange provided with a receiver for voice-frequency tones produced upon operation of said equipment, such operation generating a key signal represented by an intermediate line-current level in the closed condition of said hook-switch means, comprising:

a low-level first current sensor connected to said line at said exchange and responsive to the open condition of said hook-switch means but nonresponsive to the presence of said key signal;

an intermediate-level second current sensor connected to said line at said exchange and responsive to both the presence of said key signal and the open condition of said hook-switch means;

normally unoperated switch means at said exchange operable to connect said receiver across said line;

a coincidence circuit at said exchange connected to said current sensors for operating said switch means upon simultaneous presence of an output from said second sensor and absence of an output from said first sensor; and transition-detecting means in said coincidence circuit for preventing operation of said switch means upon a brief passage of the line current through said intermediate level.

2. A system as defined in claim 1 wherein said transition-detecting means comprises a differentiator with input connections to said line and gate means blockable by said differentiator in response to variations in line current.

3. A system as defined in claim 2 wherein said input connections include a pair of branch conductors of said line provided with respective impedances, said differentiator having inputs connected to said impedances.

4. A system as defined in claim 3 wherein each of said impedances comprises a resistor in series with a respective inductor, the inputs of said differentiator being connected to the junctions of each resistor with its associated inductor.

5. A system as defined in claim 3 wherein each of said sensors comprises an electromagnetic core with a pair of windings respectively in series with said branch conductors.

6. A system as defined in claim 2, further comprising disabling means for said differentiator controlled by said switch means to prevent a blocking of said gate means in response to minor fluctuations of said key signal.

7. A system as defined in claim 1 wherein said digit-selection means includes a dialing disk independent of said pushbutton equipment, said first sensor being responsive to line-current interruptions due to operation of said disk.

* * * * *